(12) United States Patent  (10) Patent No.: US 7,629,957 B2
Kim  (45) Date of Patent: Dec. 8, 2009

(54) LED BACKLIGHT APPARATUS WITH COLOR DEFLECTION REMOVED AT PERIPHERY THEREOF

(75) Inventor: Bum Jin Kim, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 616 days.

(21) Appl. No.: 11/585,213

(22) Filed: Oct. 24, 2006

(65) Prior Publication Data

US 2007/0146298 A1    Jun. 28, 2007

(30) Foreign Application Priority Data

Dec. 23, 2005  (KR) .................. 10-2005-0129039

(51) Int. Cl.
  *G09G 3/36*  (2006.01)
(52) U.S. Cl. ..................... 345/102; 349/61; 349/62; 349/64
(58) Field of Classification Search ............ 345/102; 349/61, 62, 64
  See application file for complete search history.

(56) References Cited

U.S. PATENT DOCUMENTS

2005/0174318 A1* 8/2005 Chou et al. .................. 345/102
2006/0007112 A1* 1/2006 Park ............................ 345/102

FOREIGN PATENT DOCUMENTS

| JP | 11-052379 | 2/1999 |
| JP | 11-162233 | 6/1999 |
| JP | 2003-195298 | 7/2003 |
| JP | 2005-203346 | 7/2005 |
| JP | 2005-243347 | 9/2005 |

OTHER PUBLICATIONS

Japanese Office Action issued in Japanese Patent Application No. JP 2006-297232, dated Jun. 2, 2009.

* cited by examiner

*Primary Examiner*—Richard Hjerpe
*Assistant Examiner*—Saifeldin Elnafia
(74) *Attorney, Agent, or Firm*—McDermott Will & Emery LLP (57) ABSTRACT

The invention relates to a direct backing type LED backlight apparatus which supplies a white light source by mixing monochromatic LEDs to a display device. The backlight apparatus includes a first LED row composed of red LEDs disposed adjacent to opposed peripheries of a substrate with green, blue and red LEDs alternately disposed between the red LEDs at the peripheries. The backlight apparatus also includes a second LED row having a similar arrangement of LEDs with blue LEDs disposed adjacent to the opposed peripheries. The backlight apparatus regulates the amount of radiation from the red and blue LEDs to be smaller than the amount of radiation from the rest of the LEDs. This allows elimination of color deflection at the peripheries of a light guide panel.

12 Claims, 9 Drawing Sheets

PRIOR ART

LED BACKLIGHT APPARATUS WITH COLOR DEFLECTION REMOVED AT PERIPHERY THEREOF

CLAIM OF PRIORITY

This application claims the benefit of Korean Patent Application No. 2005-129039 filed on Dec. 23, 2005, in the Korean Intellectual Property Office, the disclosure of which is incorporated herein by reference.

BACKGROUND OF THE INVENTION

1. Field of the Invention

The present invention relates to a light emitting diode (LED) backlight apparatus for supplying a white light source by mixing monochromatic LEDs to a display device. More particularly, the invention relates to an LED backlight apparatus which includes a first LED row and a second LED row alternating on a substrate. The first LED row includes red LEDs disposed adjacent to opposed peripheries of a substrate, with green, blue and red LEDs alternately disposed between the red LEDs adjacent to the peripheries. The second LED row includes a similar arrangement of LEDs with blue LEDs disposed adjacent to the opposed peripheries of the substrate. The backlight apparatus regulates the amount of radiation directly incident upward from a position of the red and blue LEDs adjacent to the opposed peripheries to be smaller than the amount of radiation from the rest of the LEDs, thereby eliminating color deflection occurring at the opposed peripheries of a light guide plate.

2. Description of the Related Art

In general, a Liquid Crystal Display (LCD) does not have a light source of its own, thus requiring an external illumination which typically is a backlight apparatus. The backlight apparatus illuminates the LCD from the back using Cold Cathode Fluorescent Lamp (CCFL) and LED as a light source.

An LED backlight apparatus using LED as a light source can be classified into an edge type and a direct illumination type. In the edge type, a light guide panel made of transparent material is disposed on a substrate, and light from LEDs disposed at one side or both sides of the light guide panel is incident into the light guide panel to be propagated upward by an optical pattern formed on a bottom of the light guide panel, thereby backlighting the LCD. On the other hand, in the direct illumination type, a plurality of LEDs are installed underneath the LCD to backlight the LCD. These two types have merits and demerits, respectively, but the direct illumination type is especially advantageous for backlighting a large area with high output.

Figure 1:
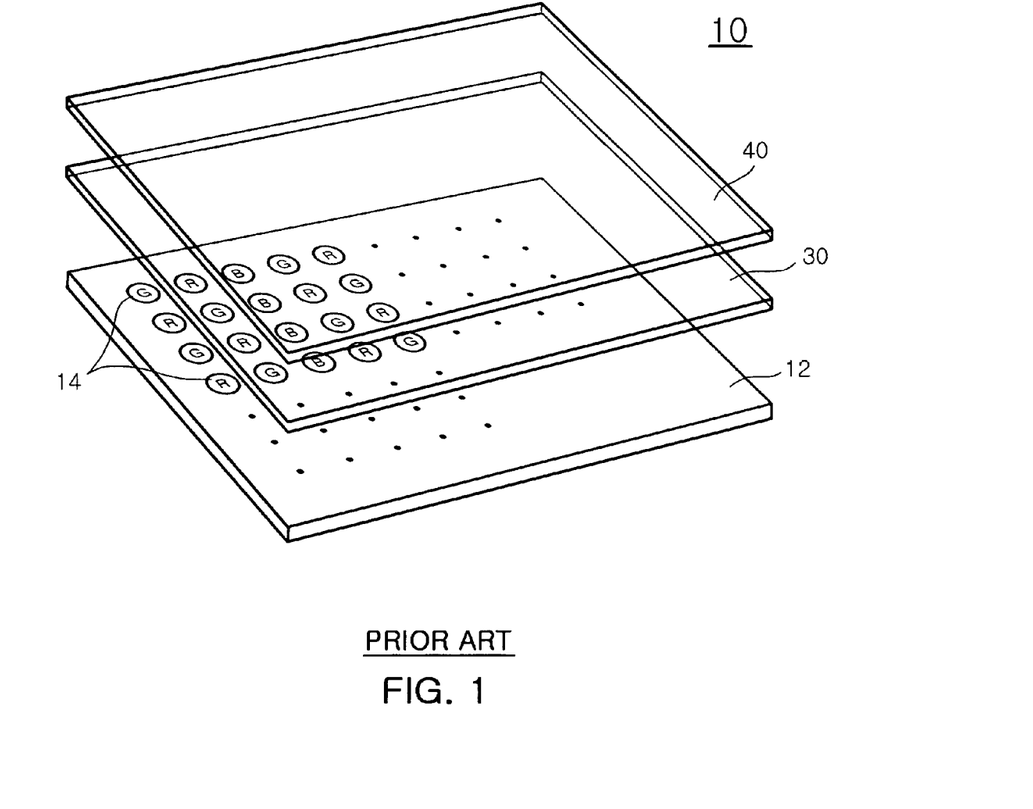
FIG. 1 is a schematic exploded perspective view illustrating a conventional LED backlight apparatus.
Figure 2:
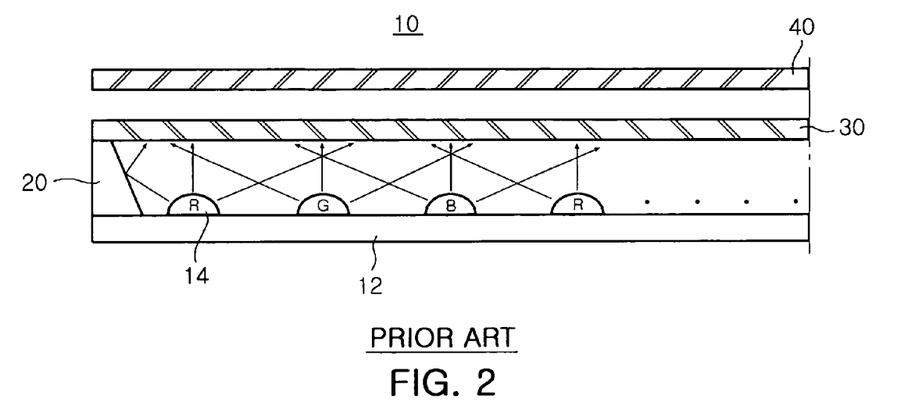
FIG. 2 is a sectional view illustrating the LED backlight apparatus shown in FIG. 1.

FIG. 1 is a schematic exploded perspective view illustrating a conventional LED backlight apparatus, and FIG. 2 is a sectional view illustrating the LED backlight apparatus shown in FIG. 1.

The conventional LED backlight apparatus 10 includes a substrate 12, a plurality of LEDs 14R, 14G and 14B disposed on the substrate, a side reflector 20 disposed in opposed peripheries of the substrate 14 and a planar optical element 30 disposed above the substrate 14. An LCD 40 is disposed above the planar optical element 30, and the light beams generated from the LEDs 14R, 14G and 14B are mixed to form white light, which passes through the planar optical element 30 to provide backlight for the LCD 40. In this specification, the planar optical element 30 designates any optical element including a diffusion plate (e.g. a microprism sheet) and an optical filter which processes the light beams emitted from the LEDs 14R, 14G and 14B before they are incident onto the LCD 40 disposed above.

Figure 3:
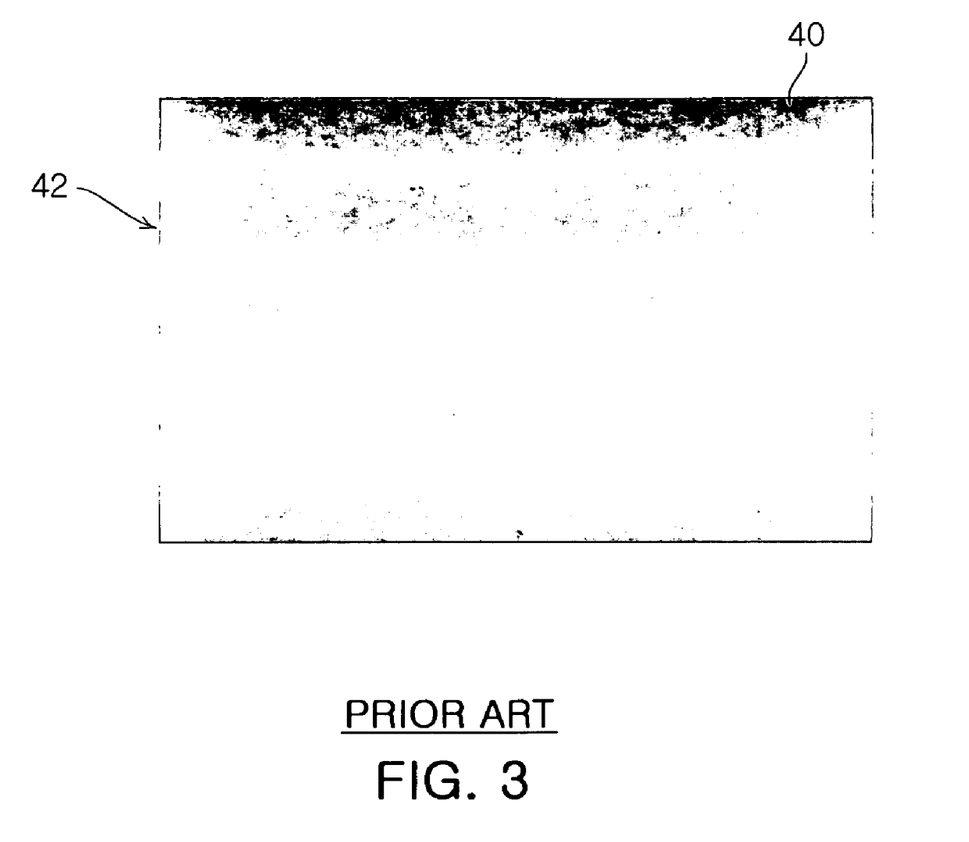
FIG. 3 is a plan view illustrating the surface of an LCD backlighted by the LED backlight apparatus shown in FIG. 1.

The conventional LED backlight apparatus 10 has following disadvantages. As shown in FIG. 3, color deflection occurs at the opposed peripheries of the LCD 40. That is, the opposed peripheries of the LCD 40 exhibit a specific color, which is due to the fact that the light beams from the red LEDs 14R or the blue LEDs 14B disposed at the peripheries are predominant over and do not mix well with other colors of light beams.

Therefore, in order to overcome such a problem, the planar optical element 30 should be disposed apart in a sufficient interval from the underlying LED 14. Alternatively, the planar optical element 30 should be formed sufficiently thick or in more layers.

However, increasing the interval between the planar optical element 30 and the LEDs 14 increases the thickness of the LED backlight apparatus 10. In addition, forming the planar optical element 30 sufficiently thick or in more layers results in increase in the weight or costs of the LED backlight apparatus 10.

SUMMARY OF THE INVENTION

The present invention has been made to solve the foregoing problems of the prior art and therefore an object of certain embodiments of the present invention is to provide an LED backlight apparatus which includes red and blue LEDs alternately disposed adjacent to opposed peripheries of a substrate and regulates the amount of light directly incident upward from the red and blue LEDs, thereby eliminating color deflection occurring at the opposed peripheries of a light guide panel.

Another object of certain embodiments of the invention is to provide an LED backlight apparatus which includes red and blue LEDs alternately disposed adjacent to opposed peripheries of a substrate and regulates the amount of light directly incident upward from the red and blue LEDs through a reflector structure, thereby eliminating color deflection occurring at the opposed peripheries of a light guide panel.

Further another object of certain embodiments of the invention is to provide an LED backlight apparatus which includes red and blue LEDs alternately disposed adjacent to opposed peripheries of a substrate and regulates the amount of light directly incident upward from the red and blue LEDs through an electronic driving circuit, thereby eliminating color deflection occurring at the opposed peripheries of a light guide panel.

According to an aspect of the invention for realizing the object, there is provided a light emitting diode (LED) backlight apparatus comprising: a substrate with a reflecting surface formed thereon; a first LED row placed on or above the reflecting surface, the first LED row including a pair of first blue LEDs positioned adjacent to opposed peripheries of the substrate and second green, red and blue LEDs alternately positioned between the first blue LEDs; a second LED row placed on or above the reflecting surface adjacent to the first LED row, the second LED row including a pair of first red LEDs each positioned adjacent the opposed peripheries of the substrate and second green, blue and red LEDs alternately positioned between the first red LEDs; and means for regulating the amount of upward radiation from a position of each of the first blue and red LEDs to be smaller than the amount of upward radiation from a position of each of the second LED.

In the LED backlight apparatus, the means for regulating may comprise a cover which blocks the first blue and red LEDs at least partially from above. In addition, the LED backlight apparatus may further comprise reflecting means which is disposed in the opposed peripheries of the substrate and includes a cavity for at least partially housing the first blue and red LEDs underneath the cover. Moreover, the cavity may have an opening in a portion opposite to the first blue and red LEDs or the LED backlight apparatus may further comprise a light absorbing material disposed in a portion of the cavity opposite to the first blue and red LEDs.

In the LED backlight apparatus, the means for regulating may comprise a driving circuit having a resistance for controlling the amount of radiation from the first blue and red LEDs to be smaller than the amount of radiation from the second LEDs.

According to another aspect of the invention for realizing the object, there is provided a light emitting diode (LED) backlight apparatus comprising: a substrate with a reflecting surface formed thereon; a first LED row placed on or above the reflecting surface, the first LED row including a pair of first type blue LEDs positioned adjacent to opposed peripheries of the substrate and second type green, red and blue LEDs alternately positioned between the first blue LEDs; a second LED row placed on or above the reflecting surface adjacent to the first LED row, the second LED row including a pair of first type red LEDs positioned adjacent to the opposed peripheries of the substrate and second green, blue and red LEDs alternately positioned between the first type red LEDs; and a driving circuit for regulating the first and second type LEDs such that the amount of radiation from each of the first type blue and red LEDs is smaller than the amount of radiation from each of the second type LEDs.

In the LED backlight apparatus, the driving circuit may regulate both of the first and second type LEDs. Alternatively, the driving circuit may regulate the first and second type LEDs separately.

In the LED backlight apparatus, the driving circuit may regulate the first and second LED rows separately.

In the LED backlight apparatus, it is preferable that each of the first type LEDs has smaller output than each of the second type LEDs. In addition, the LED backlight apparatus may further comprise a resistance disposed at an input side of each first type LED.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 4:
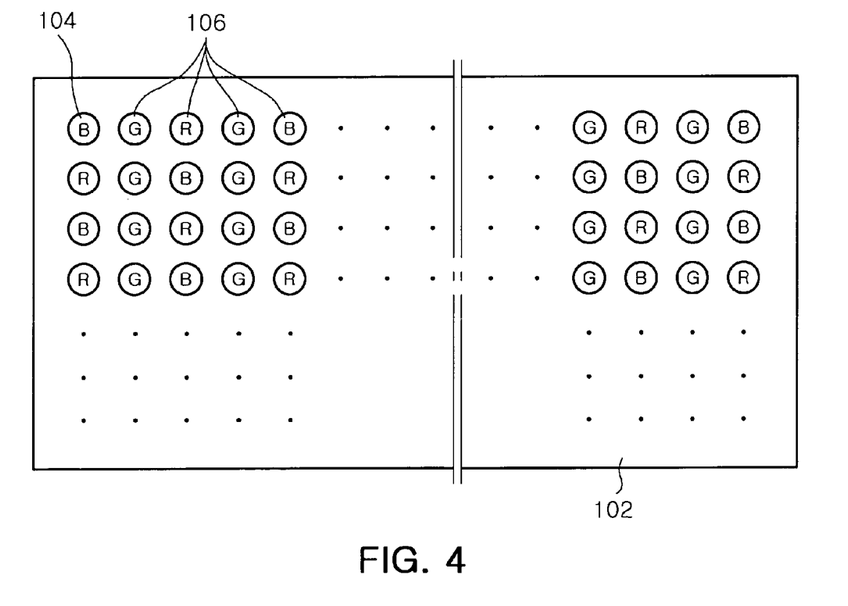
FIG. 4 is a plan view illustrating the arrangement of LEDs in an LED backlight apparatus according to the present invention.

FIG. 4 is a plan view illustrating an arrangement of LEDs in an LED backlight apparatus according to the present invention.

Referring to FIG. 4, the LED backlight apparatus of the present invention includes a substrate 102 and first LEDS 104 and second LEDs 106 disposed on an upper surface of the substrate 102.

The first LEDs 104 include first blue LEDs 104B and first red LEDs 104R, and the second LEDs 106 include second green, red and blue LEDs 106G, 106R and 106B.

The first blue LEDs 104B are disposed adjacent to opposed peripheries of the substrate 102 and the second green, red and blue LEDs 106G, 106R and 106B are alternately disposed between the opposed first blue LEDs 104b to form first LED rows.

In addition, the first red LEDs 104R are disposed adjacent to opposed peripheries of the substrate 102 and the first blue LEDs 104B, and the second green, blue and red LEDs 106G, 106B and 106R are alternately disposed between the opposed first red LEDs to form second LED rows.

The first and second LED rows are alternately disposed on an upper surface of the substrate 102, forming an LED arrangement according to the present invention.

Figure 5:
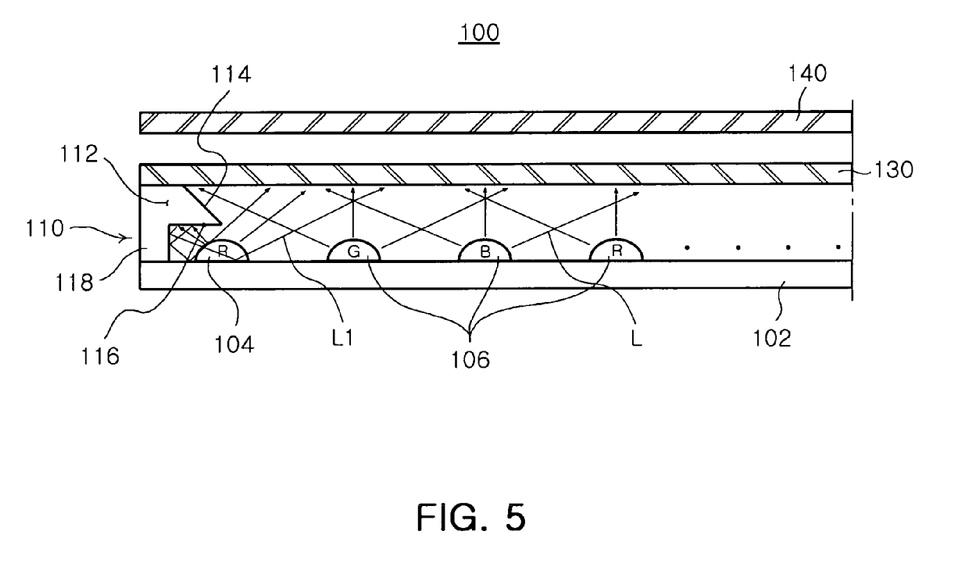
FIG. 5 is a sectional view illustrating an LED backlight apparatus according to a first embodiment of the present invention.
Figure 6:
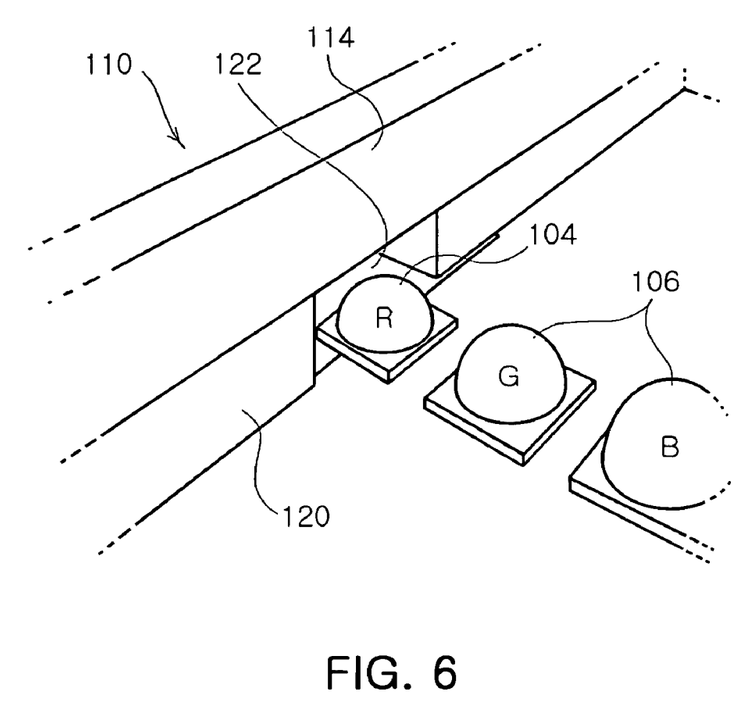
FIG. 6 is a perspective view illustrating an interior of the LED backlight apparatus shown in FIG. 5.

FIG. 5 is a sectional view illustrating an LED backlight apparatus according to a first embodiment using the LED arrangement of FIG. 4, and FIG. 6 is a perspective view illustrating the LED backlight apparatus shown in FIG. 5.

Referring to FIGS. 5 and 6 together with FIG. 4, the backlight apparatus 100 according to this embodiment includes a substrate 102, first and second LEDs 104 and 106 disposed according to the LED arrangement shown in FIG. 4 on an upper surface of the substrate 102, a reflector 110 disposed at opposed peripheries of the substrate 102, a planar optical element 130 such as a diffusion plate (e.g. a micro prism sheet) and an optical filter disposed above the LEDs 104 and 106.

The reflector 110 comprises an upper cover 112 and a sidewall 120. The upper cover 112 includes a sloped surface 114 and a lower surface 116 formed at a lower end of the sloped surface 114. The sidewall 120 has a cavity 122 and an inner wall 118 formed inside the cavity 122. The inner wall 118 and the lower surface 116 are reflecting surfaces outwardly reflecting the light beams L1 introduced into the cavity 122.

Figure 7:
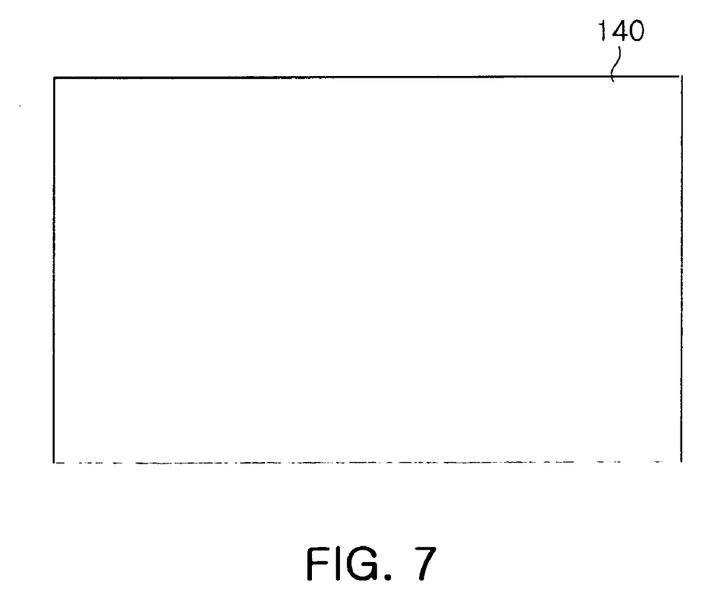
FIG. 7 is a plan view illustrating the surface of an LCD backlighted by the backlight apparatus according to the present invention.

In this way, a decreased amount of light beams emitted from the first red LED 104 directly propagates to the overlying LCD region 130. Thus, the light beams are uniformly mixed underneath the planar optical element 130 as they enter the LCD 140, providing white light illumination without color spots or color deflection. This effect is seen in FIG. 7, and is contrasted with the conventional technology resulting in color deflection as shown in FIG. 3. Therefore, the present invention eliminates the color deflection without increasing the thickness or the weight of the backlight apparatus, thereby achieving miniaturization.

In FIGS. 5 and 6, the embodiment is exemplified by the first red LEDs 104R, but the same applies to the case using the first blue LEDs 104B. Because of low luminosity factor of green, however, the green LEDs do not need to be disposed adjacent to the peripheries like the first red and blue LEDs 104R and 104B.

The cover 112 is for appropriately decreasing the amount of light beams emitted upward from the first red and blue LEDs 104R and 104B, and the amount of the decrease may vary according to the shape of the lens of the LED or the package. For example, in a case of an LED having a lens or a package for emitting light laterally, it is preferable that the amount of upward light beam is decreased by about ½. In addition, in a case of an LED having a dome or hemisphere-shaped lens or package, it is preferable that the amount of upward light beam is decreased by about ⅓.

The upper cover 112 can be configured such that it completely blocks the directly upward light beams from the first red and blue LEDs 104R and 104B depending on the purpose or the design of the backlight apparatus 100. In this case, the cavity 122 completely houses the first red and blue LEDs 104R and 104B.

In the meantime, instead of forming the cavity 120 in the sidewall 120, the entire portion of sidewall 120 can be shifted back to the position of the inner wall 118 to allow the substantially same effect.

Figure 8:
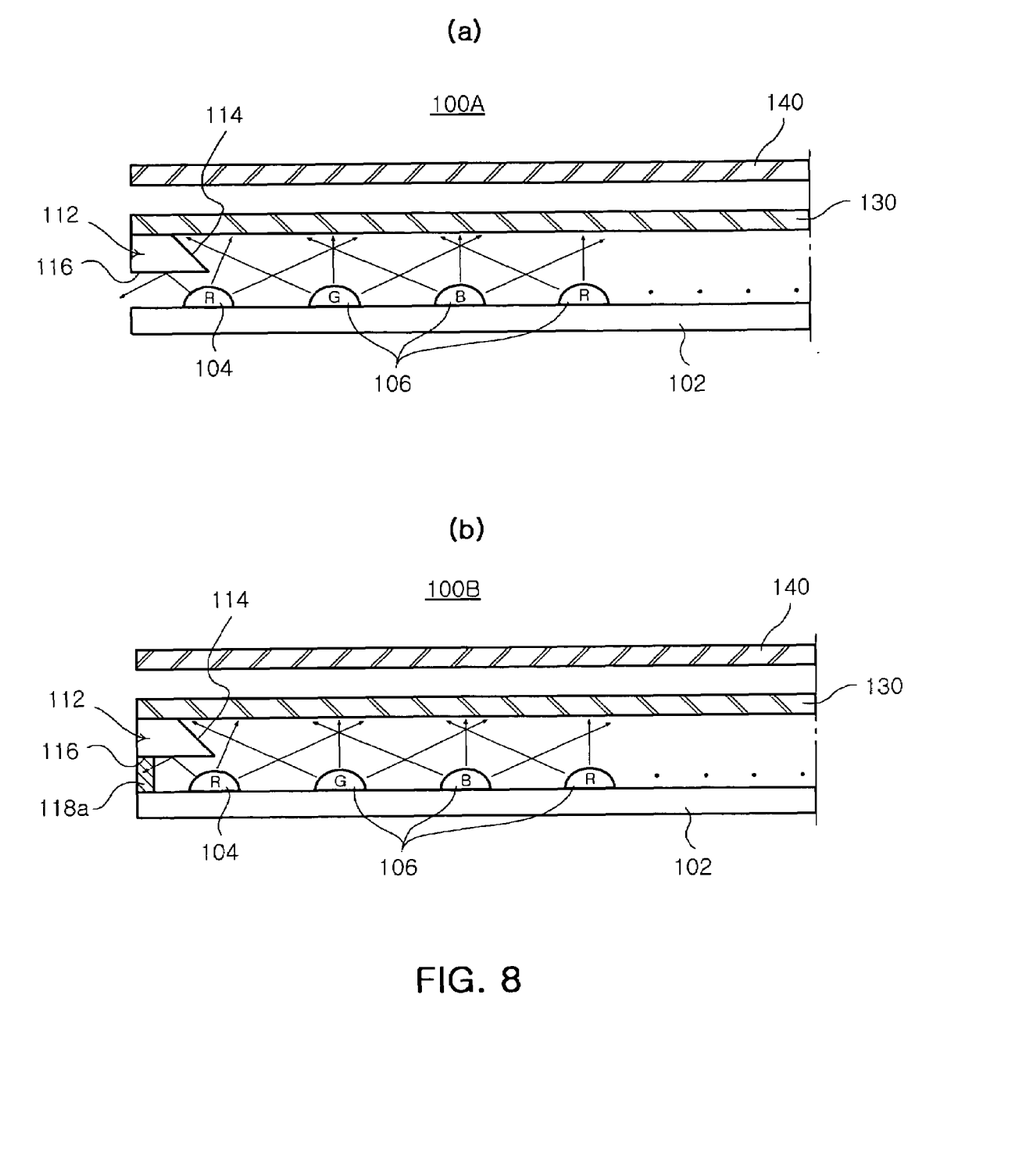
FIGS. 8a and 8b are sectional views illustrating variations from the LED backlight apparatus according to the first embodiment of the present invention.

The aforedescribed LED backlight apparatus 100 of the first embodiment can be modified as shown in FIGS. 8a and 8b. Referring to FIG. 8a, in the modified LED backlight apparatus 100A, the inner wall 118 is removed so that the light beams from the first red LED 104R incident into the cavity 122 (see FIG. 6) can be directed outward. Alternatively, as in the LED backlight apparatus 100B shown in FIG. 8b, a light absorbing material 118a can be formed in the position of the inner wall 118 to yield substantially the same effect.

Figure 9:
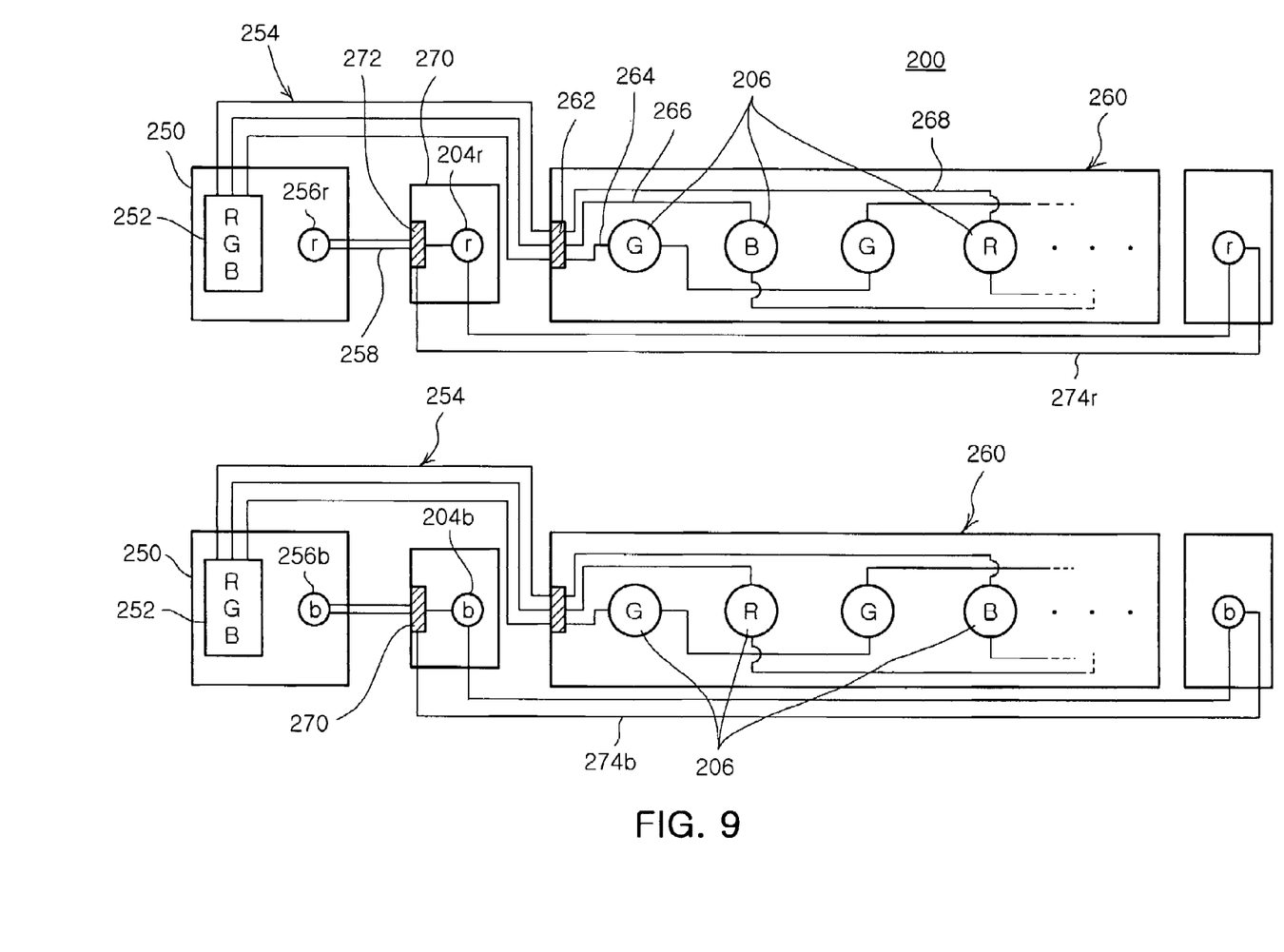
FIG. 9 is a plan view illustrating an LED backlight apparatus according to a second embodiment of the present invention.

FIG. 9 is a plan view illustrating an LED backlight apparatus according to a second embodiment of the present invention. As shown in FIG. 9, the LED backlight apparatus 200 regulates the amount of light of the first red and blue LEDs 204r and 204b disposed adjacent to opposed peripheries of the substrate through a driver 250, thereby allowing the substantially same effect as the first embodiment.

More specifically, each driver 250 includes a main driver 252 and a supplementary driver 256r, 256b. The main driver 252 is connected to a terminal 262 of a main circuit board 260 by wires 254, and the terminal 262 is connected to second type LEDs 206 by wires 264, 266 and 268. Specifically, the first wires 264 connect a plurality of green LEDs 206G in series and the second wires 266 connect a plurality of blue LEDs 206B in series. And the third wires 268 connect a plurality of red LEDs 206R in series. The configuration and operation of the main circuit board 260 and the main driver 252 is well known in the art, thus not described further.

In the meantime, the supplementary driver 256r is connected to a first type red LED 204r via the terminal 272 and the wires 258, and the first type red LED 204r is connected to another first type red LED 204r at the opposite side via wires 274r.

The first type red LED 204r has smaller output than the second type red LED 206R, and thus they require different drivers, respectively. The first type red LED 204r has smaller output than the second type red LED 206R, and the degree of difference may vary according to the purpose or the design of the backlight apparatus 200. Preferably, as described above, in a case of the first type red LED 204r having a lens or package for emitting light laterally, the first type red LED 204r may have an output that is about ½ the output of the second type red LED 204R. And in a case of the first type red LED 204r having a lens or package for emitting light upward, the first type red LED 204r may have an output that is about ⅓ the output of the second type red LED 204R.

In the meantime, the same applies to the first type blue LED 204b and its driver 256b, as in the case of the first type red LED 204r, and thus no further explanation is provided.

Using such a driver and circuit, first type red and blue LEDs 204r and 204b having smaller output are disposed adjacent to opposed peripheries of the substrate, thereby eliminating color spots or color deflection as explained in the first embodiment.

Figure 10:
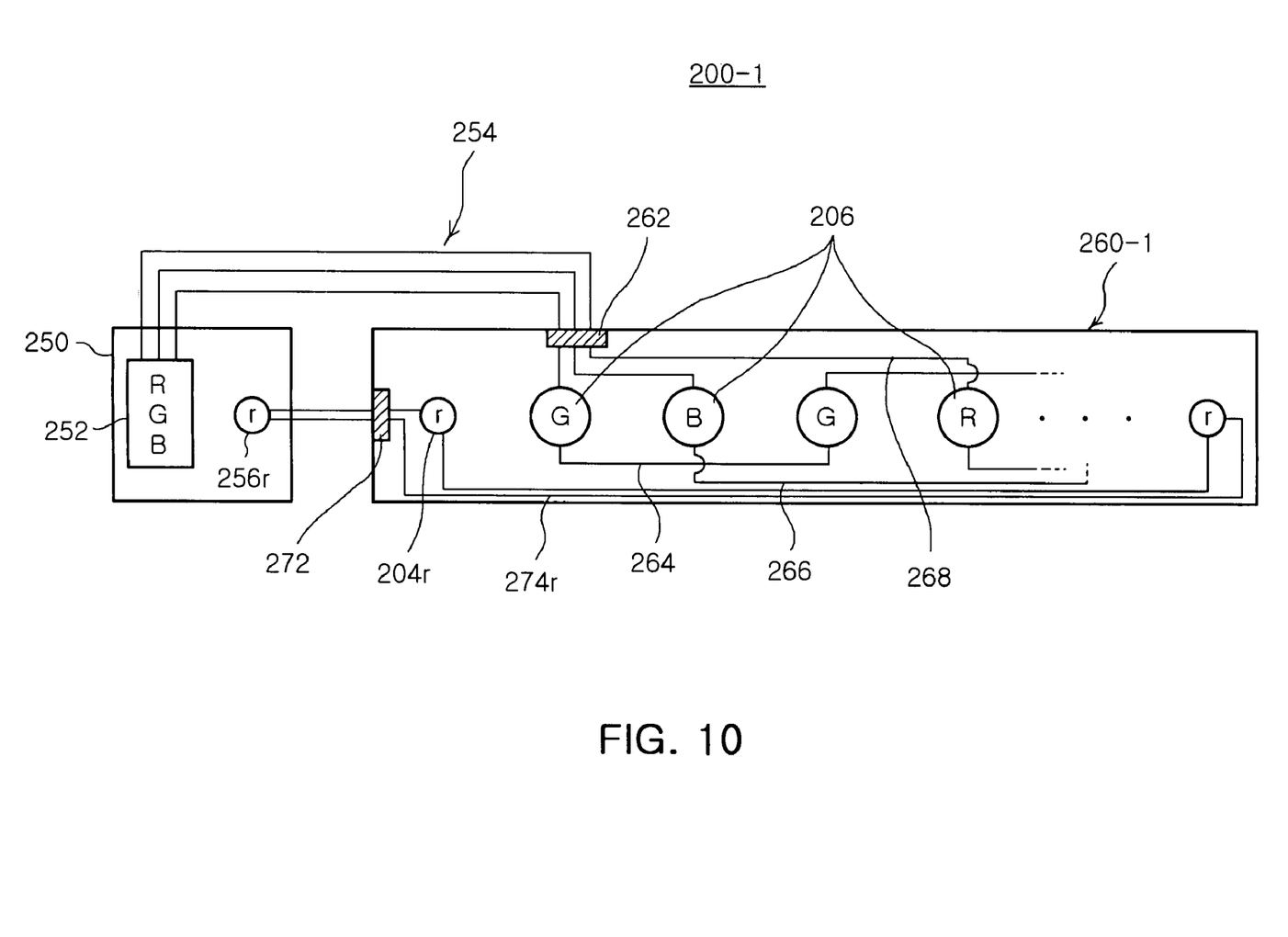
FIG. 10 is a plan view illustrating a variation to the LED backlight apparatus according to the second embodiment of the present invention.

FIG. 10 is a plan view illustrating a variation to the LED backlight apparatus according to the second embodiment of the present invention. Referring to FIG. 10, the modified LED backlight apparatus 200-1 is identical to the aforedescribed backlight apparatus 200 except for the first type red LEDs 204r being installed in the same circuit board 260-1 as the second type LEDs 206G, 206B, 206R. Unlike the backlight apparatus 200 which can adjust the distance between the first type LED 204 and the second type LED 206, the backlight apparatus 200-1 cannot adjust the distance therebetween.

Figure 11:
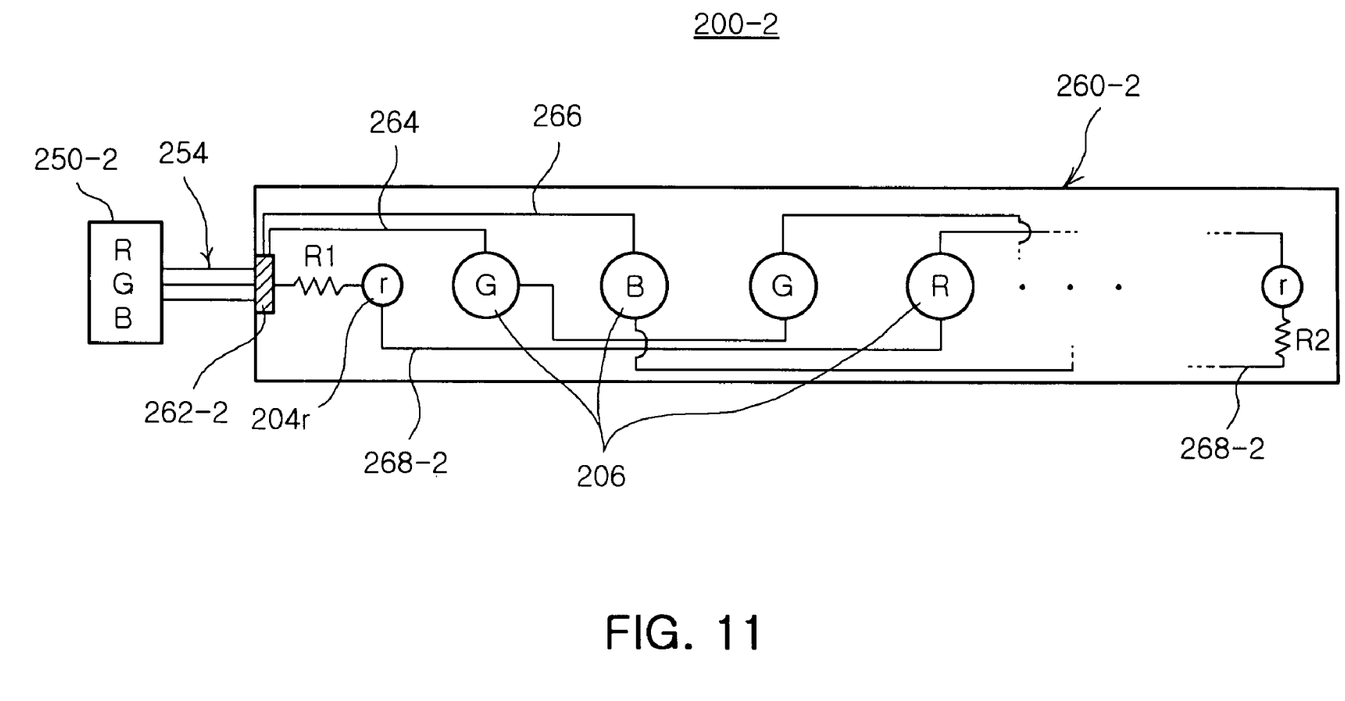
FIG. 11 is a plan view illustrating another variation to the LED backlight apparatus according to the second embodiment of the present invention.

FIG. 11 is a plan view illustrating another variation to the LED backlight apparatus according to the second embodiment of the present invention. Referring to FIG. 11, the modified LED backlight apparatus 200-2 uses a single driver 250-2 and disposes the first and second type LEDs 204 and 206 on the same circuit board 260-2 to use the same terminal 262-2. Here, it is noticeable in this embodiment that the first type red LED 204r and the second type red LED 204R are connected in series. In the meantime, each of the first type red LEDs 204r has smaller output than each of the second type red LEDs 206R, and thus in order to decrease the applied voltage, resistances R1 and R2 are installed at the input side of the first type red LEDs 204r.

This configuration also allows the substantially same effect as in the aforedescribed first and second embodiments.

As described above, the LED backlight apparatus includes red and blue LEDs alternately disposed and regulates the amount of light beams directly incident upward from the red and blue LEDs, thereby eliminating the color deflection occurring at opposed edges of the light guide panel. In addition, through the reflector structure formed at the peripheries of the substrate, the amount of light beams directly incident upward from the red and blue LEDs can be regulated. Further, using the electric driving circuit, the amount of light beams directly incident from the red and blue LEDs can be regulated to thereby eliminate the color deflection occurring at opposed peripheries of the light guide panel.

While the present invention has been shown and described in connection with the preferred embodiments, it will be apparent to those skilled in the art that modifications and variations can be made without departing from the spirit and scope of the invention as defined by the appended claims.

What is claimed is:

1. A light emitting diode (LED) backlight apparatus comprising:
   a substrate with a reflecting surface formed thereon;

a first LED row placed on or above the reflecting surface, the first LED row including a pair of first blue LEDs positioned adjacent to opposed peripheries of the substrate and second green, red and blue LEDs alternately positioned between the first blue LEDs;

a second LED row placed on or above the reflecting surface adjacent to the first LED row, the second LED row including a pair of first red LEDs each positioned adjacent to the opposed peripheries of the substrate and second green, blue and red LEDs alternately positioned between the first red LEDs; and means for regulating the amount of upward radiation from a position of each of the first blue and red LEDs to be smaller than the amount of upward radiation from a position of each of the second LED.

2. The LED backlight apparatus according to claim 1, wherein the means for regulating comprise a cover which blocks the first blue and red LEDs at least partially from above.

3. The LED backlight apparatus according to claim 2, further comprising reflecting means disposed in the opposed peripheries of the substrate, the reflecting means including a cavity for at least partially housing the first blue and red LEDs underneath the cover.

4. The LED backlight apparatus according to claim 3, wherein the cavity has an opening in a portion opposite to the first blue and red LEDs.

5. The LED backlight apparatus according to claim 3, further comprising a light absorbing material disposed in a portion of the cavity opposite to the first blue and red LEDs.

6. The LED backlight apparatus according to claim 1, wherein the means for regulating comprise a driving circuit having a resistance for controlling the amount of radiation from the first blue and red LEDs to be smaller than the amount of radiation from the second LEDs.

7. A light emitting diode (LED) backlight apparatus comprising:

a substrate with a reflecting surface formed thereon;

a first LED row placed on or above the reflecting surface, the first LED row including a pair of first type blue LEDs positioned adjacent to opposed peripheries of the substrate and second type green, red and blue LEDs alternately positioned between the first blue LEDs;

a second LED row placed on or above the reflecting surface adjacent to the first LED row, the second LED row including a pair of first type red LEDs positioned adjacent to the opposed peripheries of the substrate and second green, blue and red LEDs alternately positioned between the first type red LEDs; and a driving circuit for regulating the first and second type LEDs such that the amount of radiation from each of the first type blue and red LEDs is smaller than the amount of radiation from each of the second type LEDs.

8. The LED backlight apparatus according to claim 7, wherein the driving circuit regulates both of the first and second type LEDs.

9. The LED backlight apparatus according to claim 7, wherein the driving circuit regulates the first and second type LEDs separately.

10. The LED backlight apparatus according to claim 7, wherein the driving circuit regulates the first and second LED rows separately.

11. The LED backlight apparatus according to claim 7, wherein each of the first type LEDs has smaller output than each of the second type LEDs.

12. The LED backlight apparatus according to claim 11, further comprising a resistance disposed at an input side of each first type LED.

* * * * *